(12) United States Patent
Guo et al.

(10) Patent No.: US 6,389,034 B1
(45) Date of Patent: May 14, 2002

(54) SYSTEM FOR PROVIDING STREAM BASED AND PACKET BASED SERVICES

(75) Inventors: Ning Guo, Nepean; Leo Strawczynski, Ottawa, both of (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/148,154

(22) Filed: Sep. 4, 1998

(51) Int. Cl.[7] ............................................... H04B 7/216
(52) U.S. Cl. ...................... 370/441; 370/445; 370/479
(58) Field of Search ................................ 370/328, 335, 370/342, 441, 474, 445, 479

(56) References Cited

U.S. PATENT DOCUMENTS

| | | | |
|---|---|---|---|
| 5,022,046 A | | 6/1991 | Morrow, Jr. |
| 5,438,565 A | * | 8/1995 | Hemmady et al. ........... 370/335 |
| 5,606,552 A | * | 2/1997 | Baldwin et al. ............. 370/474 |
| 5,673,259 A | * | 9/1997 | Quick, Jr. .................... 370/342 |
| 5,872,774 A | * | 2/1999 | Wheatly, III et al. ........ 370/335 |
| 5,936,967 A | * | 8/1999 | Baldwin et al. ............. 370/474 |
| 5,999,521 A | * | 12/1999 | Thompson ................... 370/328 |
| 6,128,288 A | * | 10/2000 | Miya ........................... 370/335 |

OTHER PUBLICATIONS

Packet Radio Interface for the 3G CDMA, Irving Wang et al., Samsung, Milwaukee, WI, Jul. 14–18, 1997.
Common Packet Data Channel (CPDC) for Integrated Wireless DS–CDMA Networks, Ning Guo et al., IEEE Journal on Selected Areas in Communications, vol. 14, No. 4, May 1996.

* cited by examiner

*Primary Examiner*—Salvatore Cangialosi
(74) *Attorney, Agent, or Firm*—Jeff Measures

(57) ABSTRACT

This invention proposes a novel common packet data channel (CPDC) system structure and method to efficiently provide variable-rate packet data services in CDMA system. This system uses common code channels to serve packet data calls for a plurality of packet data users within a cell or sector. On the forward link (base station-to-mobile), an ATM-type multiplexing scheme is employed on a common code channel, while a spread ALOHA-type random access scheme is used on the reverse link (mobile-to-base station). The overhead due to call setup and channel assignment in a conventional circuit-switched system is not required in this system. The delay due to the call setup is reduced. In addition, ATM cells can be directly transmitted over the air interface. Novel transceiver architectures for the terminal and base station for implementing a system as well as particular channel signal structures are disclosed.

53 Claims, 13 Drawing Sheets

CHANNEL STRUCTURE

STRUCTURE OF THE PACKET DATA CONTROL BROADCAST CHANNEL

FORWARD CPDC PACKET STRUCTURE

FORWARD CPDC FRAME STRUCTURE

REVERSE CPDC SIGNAL STRUCTURE

REVERSE CPDC FRAME STRUCTURE

SYSTEM FOR PROVIDING STREAM BASED AND PACKET BASED SERVICES

FIELD OF THE INVENTION

The present invention relates to CDMA networks and to integrating the provision of stream-based services (eg., voice) and packet-based services.

BACKGROUND TO THE INVENTION

In wireless systems, there exists a need to support a wide variety of multimedia services, such as voice, data, video, facsimile, and interactive services, simultaneously for many different users. The users, in turn, have differing requirements. For example, voice or other real time calls are examples of stream based services which require dedicated communication channels, as lengthy delays in transmission are not acceptable. However, certain data calls, for example electronic mail or other text messages, do not require dedicated communication channels as variable or lengthy delays in transmission can be accommodated.

In a conventional IS-95 CDMA (code division multiple access) system, packet data services are provided through traffic channels, which were originally designed for voice traffic. A packet data call request and the responses to the request are communicated through the paging and access channels. Then, a traffic channel is assigned to the packet data call in a circuit-switched mode. This method causes significant transmission overhead when the packet data traffic is bursty. A further drawback is that ATM cells cannot be transmitted directly in this system.

Accordingly, a need exists for a novel system structure and method to more efficiently and more reliably accommodate various services, including variable rate packet data services.

SUMMARY OF THE INVENTION

One aspect of the invention provides a novel common packet data channel (CPDC) system structure and method to efficiently provide variable-rate packet data services in a CDMA system. This system uses CPDC channels to serve packet data calls for a plurality of packet data users within a cell or sector. CPDC channels are defined for forward link (base station-to-terminal) communications and reverse link (terminal-to-base station) communications. Preferably, on the forward link (FL), an ATM-type multiplexing scheme is employed on a CPDC channel, while a spread ALOHA-type random access scheme is used on the reverse link (RL). Advantageously, the overhead and delays due to call setup and channel assignment in a conventional circuit-switched system is reduced for packets in this system. Overhead of idle transmissions for inactive terminals is also reduced. The preferred embodiment allows ATM cells to be directly transmitted over the air interface.

One advantage of CDMA systems compared to other types of digital cellular systems is that several terminals can communicate using the same frequency simultaneously. It is well known for CDMA systems that several virtual channels can be used by having each communication unit code their transmissions with a distinct spreading code sequence. Furthermore, only a communication unit with the appropriate code can decode such a coded message. This provides security against eavesdropping and also provides a multiple access scheme. These aspects of CDMA are well known in the art. It is also known that several communication units can communicate using the same spreading code as long as they are offset in time. This is currently utilized in the access channel, which is shared by a plurality of terminals in a cell/sector. Thus if, for example, three terminals send requests on the access channel using the same spreading sequence, the first received request can be successfully decoded, even if they overlap, provided they are offset in time. Of course in conventional systems, the subsequent requests are discarded. However, we have taken advantage of this property of a CDMA system to allow for the transmission of a plurality of overlapping signals (but offset in time) in the reverse link. Thus, a plurality of terminals can send overlapping transmissions of packet data using the same spreading code sequence to the base station. A base station according to a preferred embodiment of the invention can decode a plurality of overlapping frame signals by utilizing a plurality of CPDC receivers which each decode a separate signal. Thus, for example, a base station can receive multiple packet messages from a plurality of terminals all using the same spreading code sequence as long as there is some time offset between the reception of the plurality of signals by the base station.

Another aspect of the invention provides a terminal (and method of using said terminal) for using said CPDC system.

BRIEF DESCRIPTION OF THE DRAWINGS

The present invention, together with further objects and advantages thereof will be further understood from the following description with reference to the drawings in which:

FIG. 3 illustrates the forward link common packet data channel (CPDC).

FIG. 4 illustrates the reverse link common packet data channel.

DETAILED DESCRIPTION OF THE PREFERRED EMBODIMENTS

A preferred embodiment of the present invention will now be discussed with reference to an IS-95 CDMA system. However, the principles can be applied to wideband CDMA systems and multi-carrier (MC) CDMA systems.

We will also describe the preferred embodiment with reference to a multi-mode terminal which can communicate using stream based or packet based services or both services simultaneously. Note that terminals can be voice only, multi-mode, or packet only in this system. Furthermore, the preferred embodiment of the present invention will be described with respect to mobile station terminals. However, it should be noted that the terminals may take other forms, including for example, fixed wireless access terminals and portable computers using a CDMA transceiver.

Figure 1:
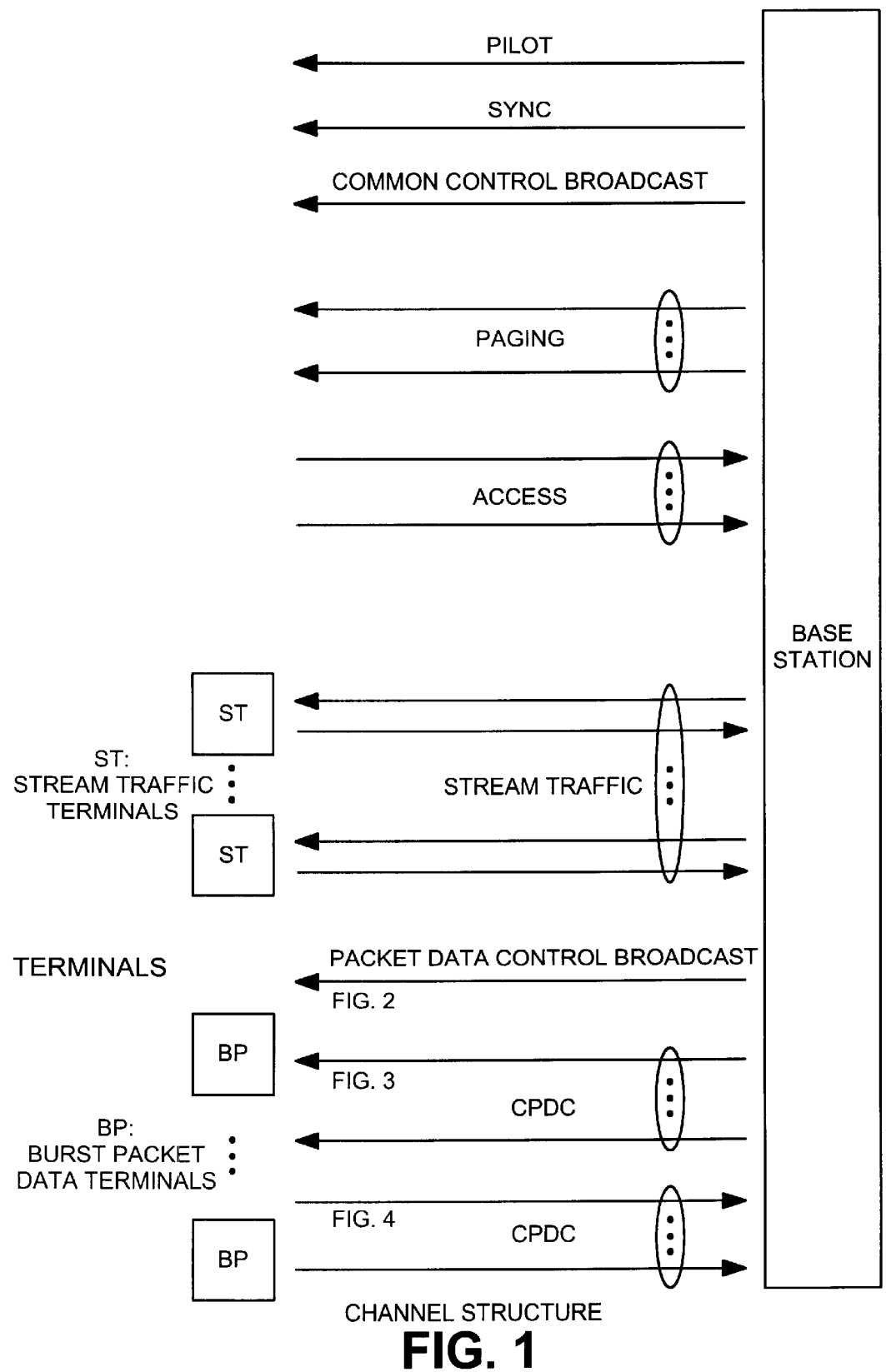
FIG. 1 is a schematic drawing illustrating the channel structure in a CDMA system for providing both stream and packet based services according to a preferred embodiment of the present invention.

FIG. 1 shows the channel structure in an omnidirectional cell or a cell sector. The straight lines with downward and upward arrows are CDMA channels on the forward and reverse links, respectively. By "channel", we mean a logical channel representing data on a CDMA carrier which can be decoded using a particular spreading code sequence. For example, there is a separate spreading code sequence for each of the pilot, synchronization, paging and access "channel" functions. The pilot, sync, paging and access channels function in the same manner as in IS-95. As can be seen in FIG. 1, there can be multiple paging, access, stream traffic and forward and reverse link CPDC channels. There could also be multiple packet data control broadcast (PDCB) channels. FIG. 1 also illustrates a base station serving a plurality of terminals using the stream traffic channels, as well as a plurality of terminals using the packet data services (that is to say the CPDC channels) in either an omnidirectional cell or a cell sector. The stream traffic channels provide the circuit-switched services including voice and data services, which involve transmission of a large amount of information over a relatively long time duration, such as video, facsimile, and long data file transfer. The stream traffic channels are organized in pairs as each "call" on a stream traffic channel comprises a forward link from the base station to the terminal, and a reverse link from the terminal to the base station. Each link is assigned a CDMA spreading code in the conventional manner.

The packet data control broadcast (PDCB) channel and the forward and reverse link common packet data channels are used to provide packet data services. The packet data control broadcast channel is assigned a distinct code sequence, which is known to all packet data users within a sector. Each forward link and reverse link CPDC channels is also assigned a distinct code sequence which is used by a plurality of terminals. To achieve duplex communication, reverse link and forward link channels will often be organized in pairs. It should be appreciated that some data applications will not require full duplex communications, for example an e-mail message. Even for such simple services, transmission of responses, such as acknowledgements and other control information are typically required. These responses may be transmitted on a "paired" channel, although this is not necessarily the case. For example, responses for one-way reverse link data packets from a terminal to the base station can be sent on the PDCB rather than a "paired" FL CPDC.

When a terminal registers, the base station sends registration information to the terminal which specifies which spreading code sequences to use for both the PDCB channel, and the reverse link CPDC channels. This information can include parameters to generate the spreading code sequences as a notification as to which previously defined sequence the terminal should use. The terminal stores this information in its internal memory, and uses the specified code sequences to monitor for packet page messages from the PDCB channel and for transmitting packets on the reverse link CPDC. Typically, a packet page message on the PDCB channel will provide information which specifies which spreading code sequences to use to receive incoming packets from a forward link CPDC. However, such information could also be provided on registration.

Figure 2:
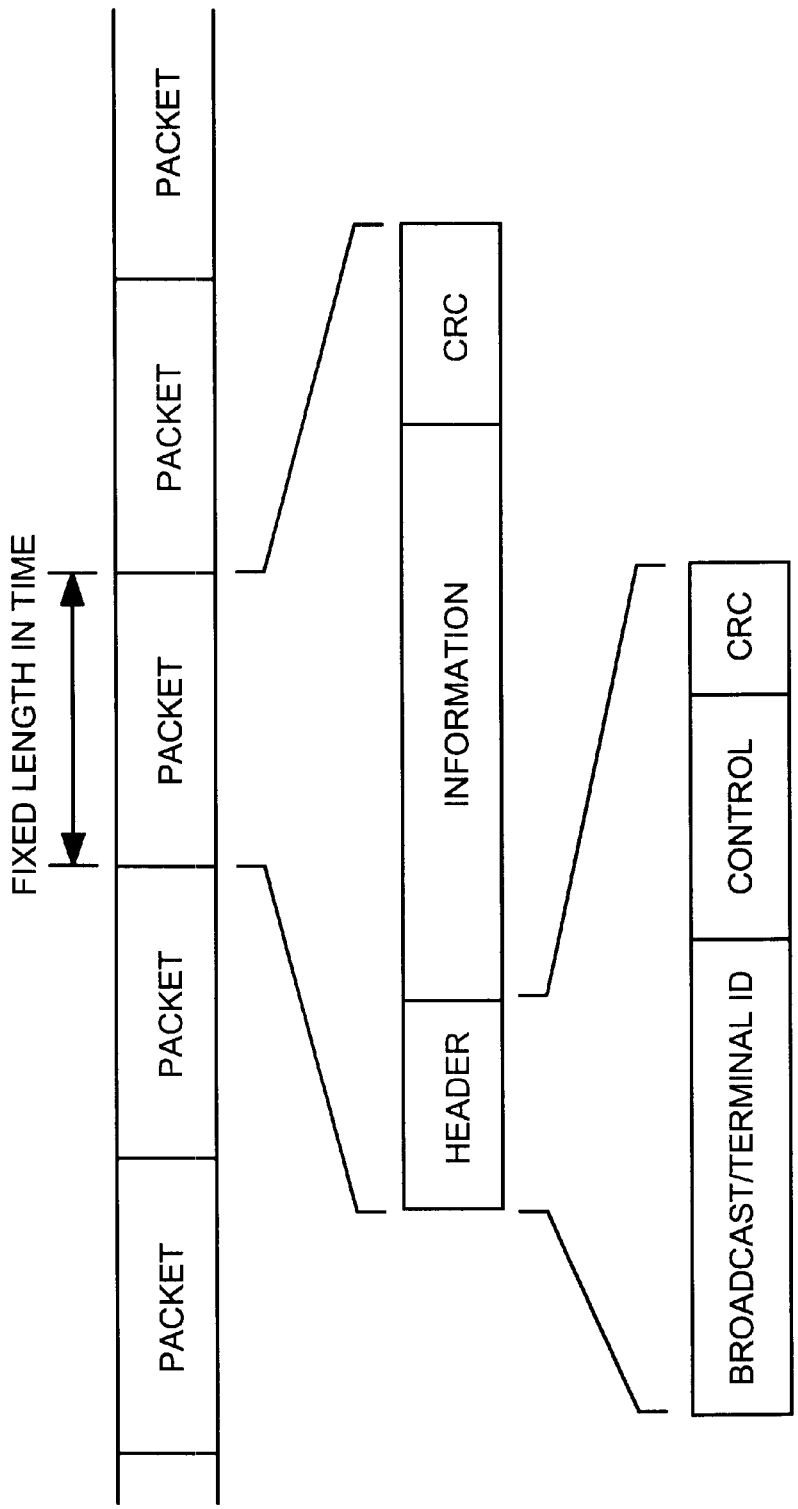
FIG. 2 is a schematic drawing illustrating the packet data control broadcast channel packet structure according to the embodiment of FIG. 1.

The control and signalling information related to packet data services is conveyed through the packet data control broadcast channels to all packet data terminals within a cell or cell sector. FIG. 2 is one possible structure of the packet data control broadcast channel. Each packet comprises a header section, an information section and a cyclic redundancy code (CRC). The header section comprises addressing information directed to a particular terminal (or a broadcast message to a group of terminals or all terminals), control information flag and a CRC code. The two CRC codes are used by the terminal for error detection purposes. The control information flag is used to indicate whether the payload is data, control information (and, if so, of which type) or null. These data packets typically undergo forward error correction coding, interleaving, modulation and spreading to form a frame structure (not shown) which is transmitted. The control information can include:

packet page message;

radio link protocol (RLP) ARQ acknowledgement;

CPDC channel assignment message on forward and reverse links; and packet data rate;

and preferably can include:

power control message;

load balancing message;

congestion control message; and flow control message.

Examples of data in the PDCB include short messages for a packet data capable terminal (note that short message service (SMS) messages can still be sent in the conventional manner using the paging channel, but including such messages in the PDCB can allow packet-only-terminals to receive the equivalent to SMS).

A base station may have one or more forward CPDC channels per sector or omnidirectional cell. Each forward CPDC channel is assigned a distinct code sequence which is shared by a plurality of terminals. Preferably, the base station determines and adjusts the transmission rate according to the packet data traffic, the interference levels of the system, the available system capacity and the priority of the ongoing packet data call(s). The information on the transmission rate is broadcast on the packet data control broadcast channel. Data packets destined to all or some of the packet data users within the sector are transmitted through a forward CPDC channel. The data packets to be transmitted are buffered at the base station. Typically, the base station, as it serves a plurality of terminals, will be transmitting a continuous stream of packets. Preferably, the base station pipes the packets through a forward CPDC channel by using an asynchronous transmission scheme such as ATM. The base station arranges the transmission order of the data packets based on certain priority criteria (for example, quality of service) or on a first-come-first-served basis.

Figure 3A:
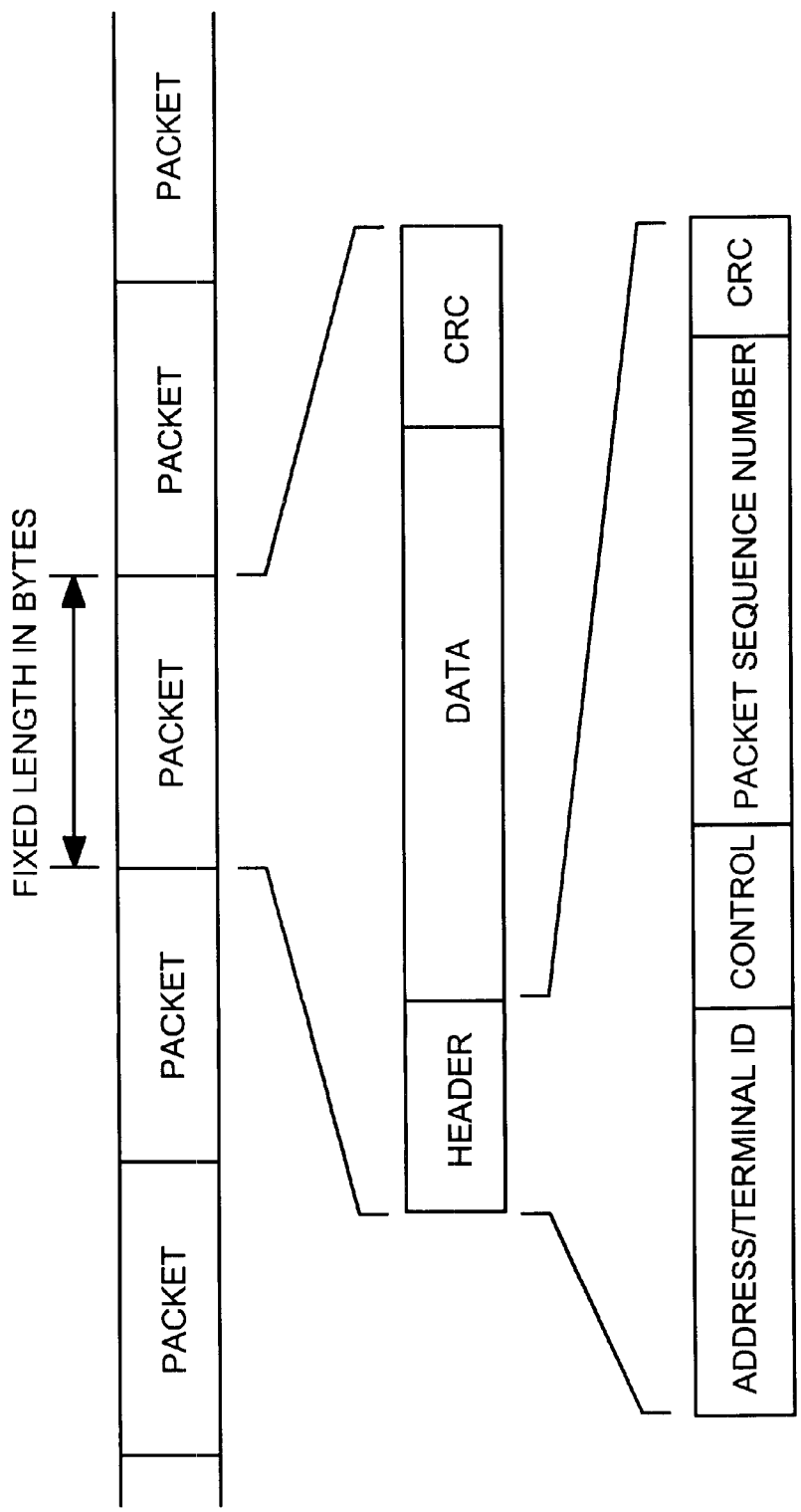
FIG. 3a illustrates the logical structure of the packets.
Figure 3B:
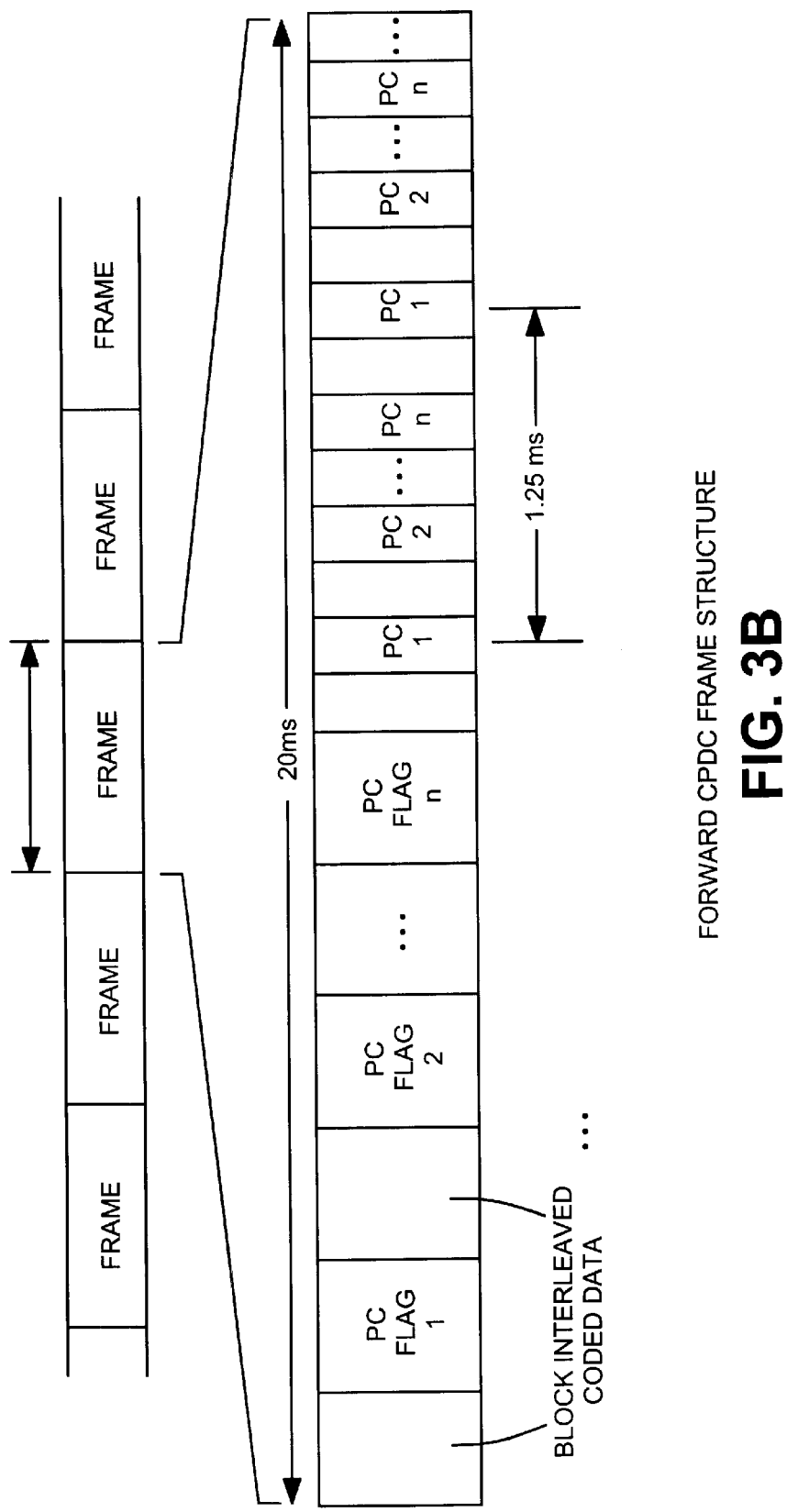
FIG. 3b illustrates the frame structure of the channel as transmitted by the base station.

FIG. 3 illustrates a forward common packet data channel structure. FIG. 3 comprises FIG. 3a, which illustrates the logical packet structure, and FIG. 3b which illustrates the frame structure of the channel. Referring to FIG. 3a, each packet in the forward CPDC channel has a fixed length in bytes and comprises a header section, a payload section and a CRC code. The payload can carry user data, control information or null data. Preferably, the payload is sufficient to contain the payload of one or more ATM cells. The header section comprises address information for which terminal the packet is directed, control information, packet sequence number information and a CRC code to be used for error detection/correction. Preferably, the data section is encrypted for security purposes. FIG. 3b will be discussed below.

Note that a packet in the PDCB channel in FIG. 2 is shown to have a fixed length in time, whereas the packet in FIG. 3 is stated to have a fixed length in bytes. This indicates that the PDCB is broadcast at a constant rate, whereas the rate of broadcast of the CPDC packets is variable.

Figure 4A:
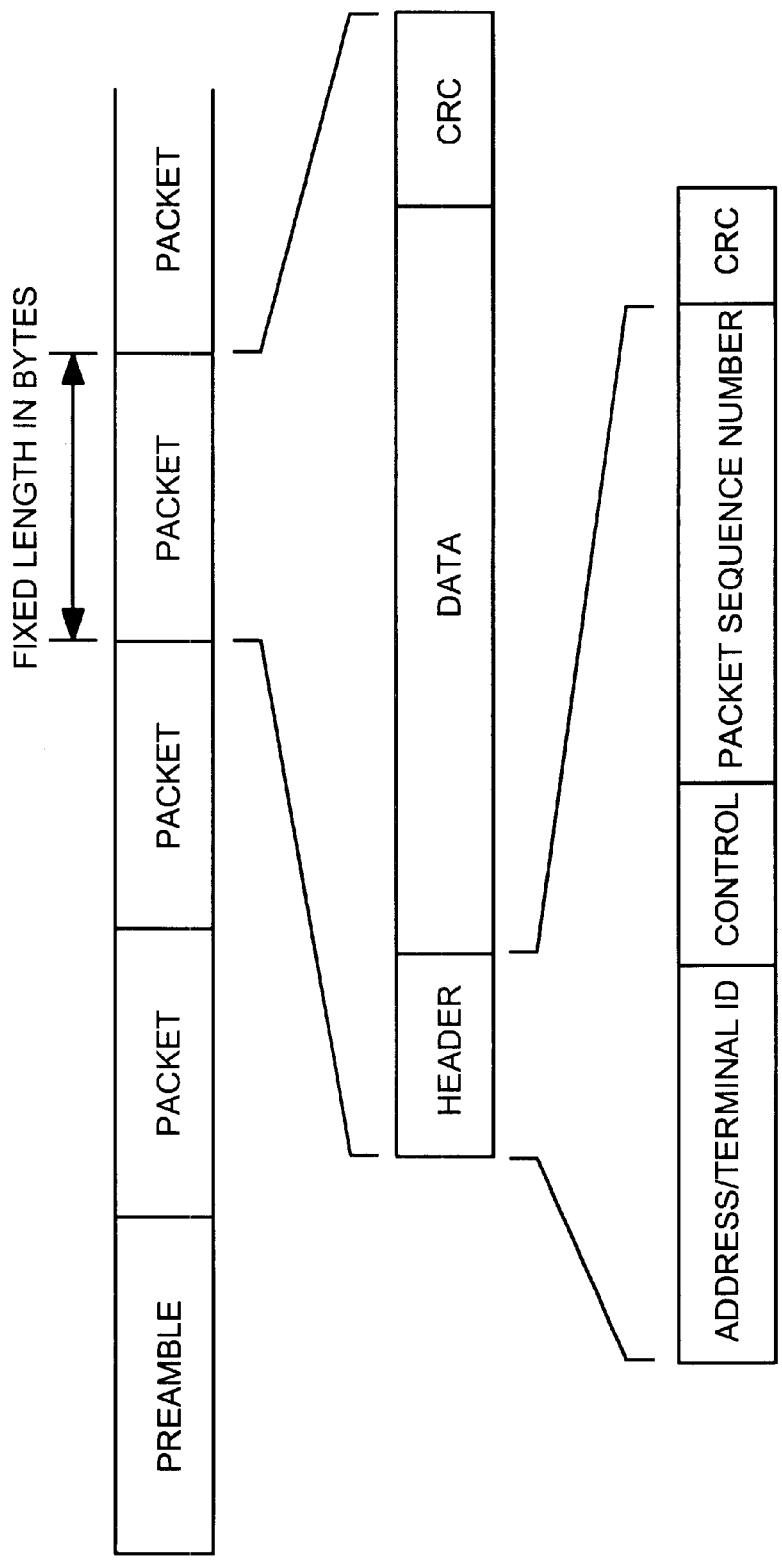
FIG. 4a illustrates the logical structure of the packets.
Figure 4B:
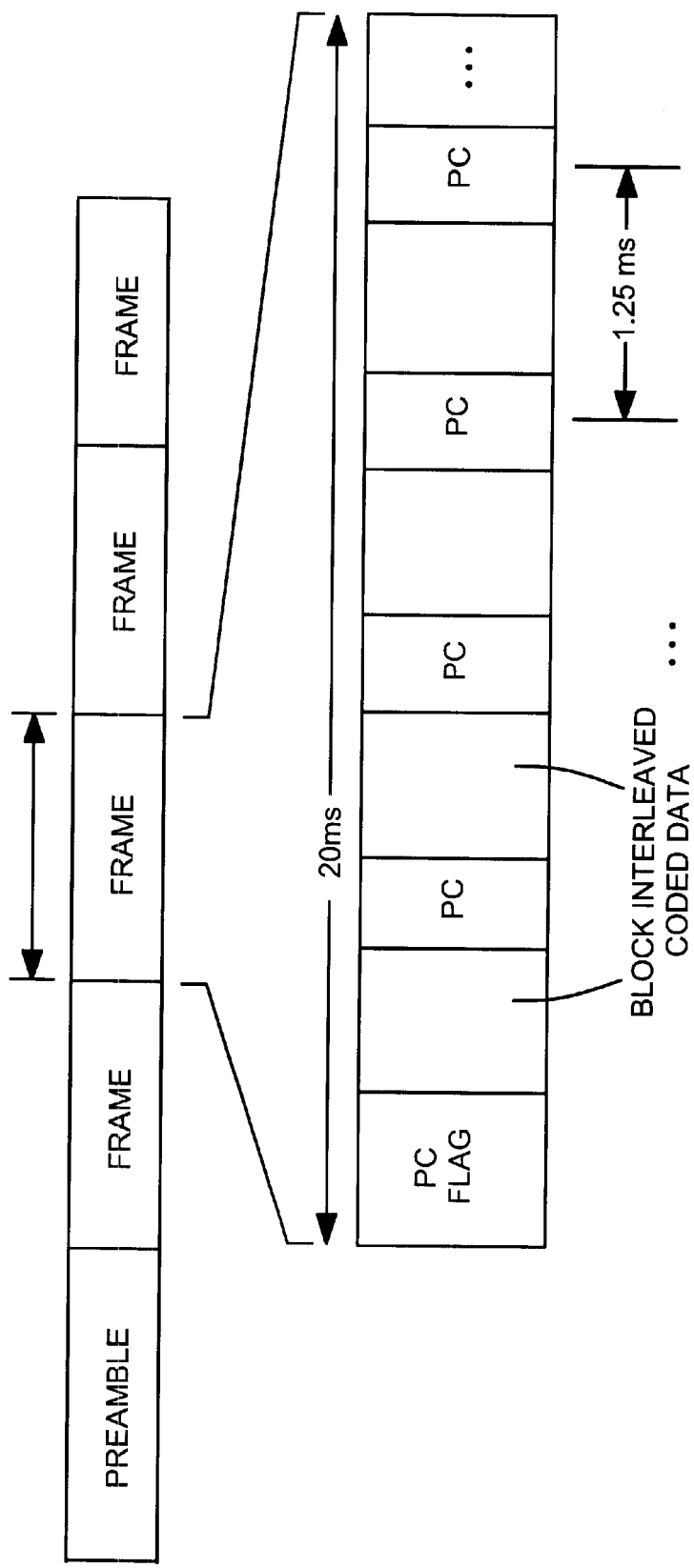
FIG. 4b illustrates the frame structure of the channel as transmitted by the terminal.

A base station may have one or more reverse CPDC channels for a sector or onmidirectional cell. A reverse link channel is shown in FIG. 4. FIG. 4 comprises FIG. 4a, which illustrates the logical packet structure, and FIG. 4b which illustrates the frame structure of the channel. Referring to FIG. 4a, each reverse CPDC channel is assigned a distinct code sequence which is shared by a plurality of terminals. Each terminal may transmit at varying data rates, which are determined by the base station and transmitted to a terminal by means of a PDCB or FL CPDC packet data rate or flow control message. Note that the terminal preferably starts transmission of its packet burst at a default rate in order to conserve network resources and then the terminal can adjust the transmission rate if it receives a flow control message from the base station. Note that if there are multiple CPDC channels, they may have different transmission rates. A packet data capable terminal originates a packet data call or burst by starting transmission whenever it has messages to be delivered to some destination (unless the terminal has received a congestion message via the packet data control broadcast channel). Thus, the CPDC reverse link employs an ALOHA-type random multiple access scheme. For the purpose of synchronization acquisition, a preamble is transmitted at the beginning of a packet data burst. The preamble also includes control information, including the terminal ID and acts as a request by the terminal to the base station to transmit packet data, and/or the control information can include acknowledgement data, in which case the preamble acts as an acknowledgement message.

The forward and reverse link CPDC's effectively give to the terminal a virtual circuit because all packets directed to the terminal can be received by the terminal over the forward link CPDC and whenever the terminal has a packet to send it can transmit the packet or burst of packets on the reverse link CPDC (subject to a congestion message broadcast from the base station). Thus, as far as the terminal is concerned, a virtual circuit for providing packet data communication is established between the base station and the terminal, even though a plurality of other terminals can be using the same forward and reverse link CPDC channels at the same time. Furthermore, the terminal can utilize more than one virtual circuit if needed for multiple applications.

Each packet in the reverse CPDC channel has a fixed length in bytes and comprises a header section, a payload section and a CRC code. The payload can carry user data, control information (for example, ARQ/ACK and radio link protocol (RLP) control message) or null data. Preferably, the payload is sufficient to contain the payload of an ATM cell. The header section comprises source and destination address information, control information, packet sequence number information and a CRC code to be used for error detection/correction. Preferably, the data section is encrypted for security purposes. FIG. 4b will be discussed below.

Figure 5:
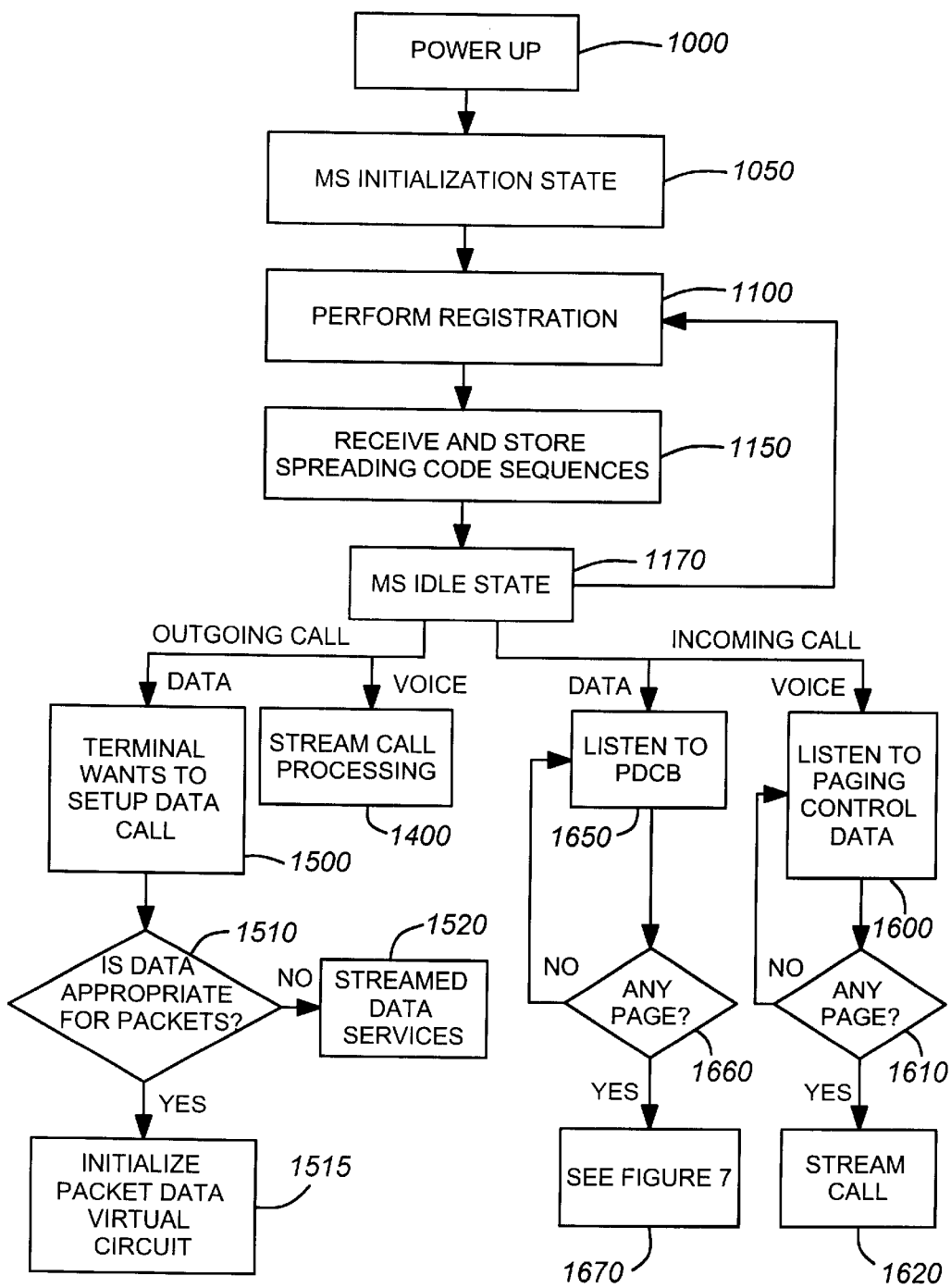
FIG. 5 is a flowchart of the steps carried out by a terminal according to a preferred embodiment of the present invention.

FIG. 5 is a flow chart illustrating the steps carried out by the controller of the terminal. When the terminal first powers up 1000, the terminal enters into an initialization state 1050. During the initialization state, the terminal boots and then scans the pilot and sync channels in a conventional manner. Once the terminal has acquired the pilot and system timing, the terminal performs registration 1100, where conventional registration tasks are performed, and the terminal also receives and stores spreading code sequences 1150 in order to access and use the various system channels. In particular, the terminal receives registration information which specifies the spreading code sequences for the packet data control broadcast channel and the common packet data channels as discussed above. As noted previously, the CPDC channels comprise both forward link and reverse link CPDC channels. As previously stated, a particular cell or sector may have a plurality of CPDC channels. In such circumstances, upon registration, the terminal receives from the base station an indication via the PDCB as to which of the RL CPDC channels to use for page response messages referred to in FIG. 7, as well as which RL CPDC to use to originate packet calls. The terminal then enters the idle state 1170. During the idle state, the terminal monitors the network for an indication that an idle hand off is appropriate, monitors its own internal operations to determine whether an outgoing call is to be made, and also monitors both the paging channel and the PDCB channel for an incoming stream call page or an incoming packet page message. Hand off 1180 is handled in the conventional manner. An outgoing "call" can be handled in one of two ways. It can be handled by making a stream call or it could be handled by sending data packets where appropriate. According to the preferred embodiment, the mobile station first makes a decision as to whether it is a voice call in which case it is handled by a stream based call in a conventional manner 1400. If it is a data call, the call could be handled either in a stream based service or as a packet, depending on the nature of the data to be sent (and possibly also by the capacity on the stream services channels and/or the packet data channels).

When the terminal needs to set up a data call 1500, the terminal first determines whether the data is best suited for packet delivery or whether it requires a dedicated streaming service (circuit switched call) 1510. Note, in this example, we are assuming the terminal can communicate by voice or by streamed or packet data, for example, a fixed wireless access subscriber unit capable of providing telecommunication services to both telephones and modems for transmitting data from a personal computer, or a wireless web browser phone capable of receiving and using data as well as providing voice telephony. Table 1 lists a series of possible services available to the terminal, and the preferred type of communication service required for each.

TABLE 1

| Teleservice | Service Type |
| --- | --- |
| Speech | circuit switched |
| Asynchronous Data | circuit switched |
| Rate Adapted ISDN | circuit switched |
| Group 3 Fax | circuit switched |

TABLE 1-continued

| Teleservice | Service Type |
|---|---|
| Video Telephony | circuit switched or packet data |
| Electronic Mail | packet data |
| Database Access | packet data |
| World Wide Web Access | packet data |
| File Transfer | packet data |
| Broadcast Data | packet data |
| Program Sound | packet data |
| Electronic Newspaper | packet data |

In such a situation, the enquiry at 1510 can be answered by an indication by the user/computer application as to the type of service required. (Alternatively, a sophisticated terminal can analyse the type and length of data in order to determine the type of service required. This will require some buffering and/or possibly redirection of the call after some interval.) Assuming the first option, let us take as an example a fixed wireless access subscriber unit which acts as a telephone and a modem for a personal computer. The subscriber unit can determine whether the handset for the telephone has gone off hook, and in which case, use the access channel to set up a circuit switch stream service for voice communications. For situations where a user wants to send data, the computer can be equipped with software for sending an indication to the terminal as to the type of request being made. In this example, step 1510 is answered by either an indication from the user or software resident in the computer for directing data files according to Table 1. For example, let us assume that the user of the terminal has requested to send a document by fax. In which case, according to Table 1, a fax is best handled by a streaming service. The terminal will receive such an indication from the computer and then select the streaming service call processing step 1520. Let us now assume that the user of the computer has made a request to send a text message by electronic mail. Such a text message is best treated as packet data and the computer will therefor instruct the terminal that a packet data call is required and establish virtual circuit 1515. Subsequent e-mail messages are directed to this virtual circuit for transmission of data packets. Of course, the terminal and computer can be integrated into a single unit. The steps for an outgoing data call, starting at step 1515, will be discussed below with reference to FIG. 6.

Continuing with the idle state according to the preferred embodiment in FIG. 5, with respect to incoming calls, the terminal is equipped with two code sequence generators so that it can monitor the paging channel 1600 and the PDCB channel 1650 in parallel. If an incoming streaming services page is detected at 1610, the terminal proceeds to conventional stream service call set-up 1620; otherwise, the terminal continues to monitor for incoming pages. Meanwhile, the terminal is monitoring the PDCB for incoming packet page messages at 1650. If such a page is received 1660, the terminal processes the incoming packet page according to FIG. 7. If no such packet page message is received, the terminal continues in the idle state to monitor incoming pages. Note that the terminal can monitor for pages in an alternative manner. For example, if only one code sequence generator is used, the terminal can monitor the paging channel and the PDCB channel in a serial alternating manner rather than in a parallel manner. As a further alternative, a terminal can only monitor the PDCB if the base station is configured to send both stream and packet page messages via the PDCB. Note that for battery powered terminals, in order to conserve battery power, the terminal may enter a sleep mode during the idle state. In which case, the terminal will "wake up" periodically, for example once per second, to carry out the idle state processes.

Figure 6:
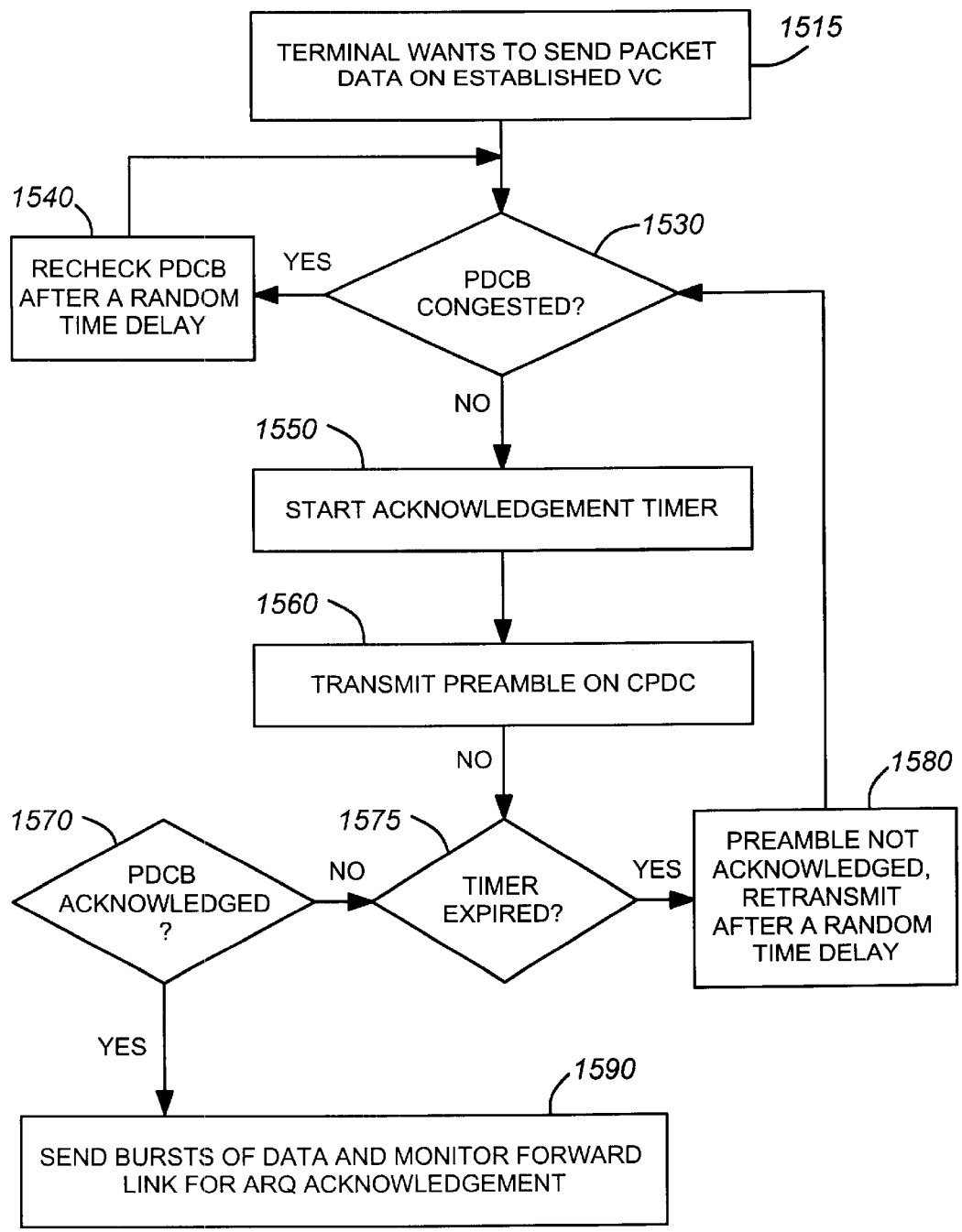
FIG. 6 is a flowchart of the steps carried out for an outgoing data call by a terminal according to the embodiment of FIG. 5.

Referring to FIG. 6 when packets are delivered to the terminal for transmission 1515, the terminal monitors the PDCB to determine whether a congestion message has been transmitted by the base station 1530. A congestion message may take the form of a specific message transmitted on the PDCB. Alternatively, a set of congestion control bits can be sent in routine messages. If a congestion message has been received, the terminal waits a random time delay and then re-checks the PDCB for a congestion message 1540. Assuming no congestion message has been received, the terminal proceeds to transmit. Note, as an alternative, the terminal can constantly monitor the PDCB and set a flag whenever such a congestion message is received. The terminal will also flag whenever the PDCB is not congested. In which case, step 1530 simply involves consulting the flag to make the determination. In any event, assuming no congestion, the terminal transmits the preamble on the reverse link CPDC 1560. The preamble comprises sync information to the base station as well as control information which includes the terminal ID and identifies the terminal making a request to send data to the base station. The terminal starts an acknowledgement timer 1550, and then at step 1560, the terminal transmits the preamble on the reverse link CPDC as described with reference to FIG. 4. The terminal then monitors the PDCD at 1570 for an acknowledgement from the base station of the preamble transmitted at 1560. While no acknowledgement exists, the timer continues 1575 and unless the timer has expired, the terminal continues to retransmit the preamble 1560. If the timer has expired, the terminal then waits a random period of time and attempts to transmit again 1580. As soon as the terminal receives the acknowledgement from the base station, the terminal transmits the burst of packet data according to the structure of FIG. 4. While transmitting the packet 1590, the terminal performs radio link protocol (RLP) tasks, for example, it monitors the PDCB for acknowledgements by the base station and retransmits packets if needed. As an alternative, the acknowledgement can be sent by the BTS on the forward link CPDC as a control packet directed to the terminal or as subchannel information as discussed below. The burst is variable in length as the terminal continues to transmit packets of data until no additional packets (or retransmitted packets) are waiting to be sent. The terminal can also transmit subchannel information as discussed below with reference to FIG. 4b.

Figure 7:
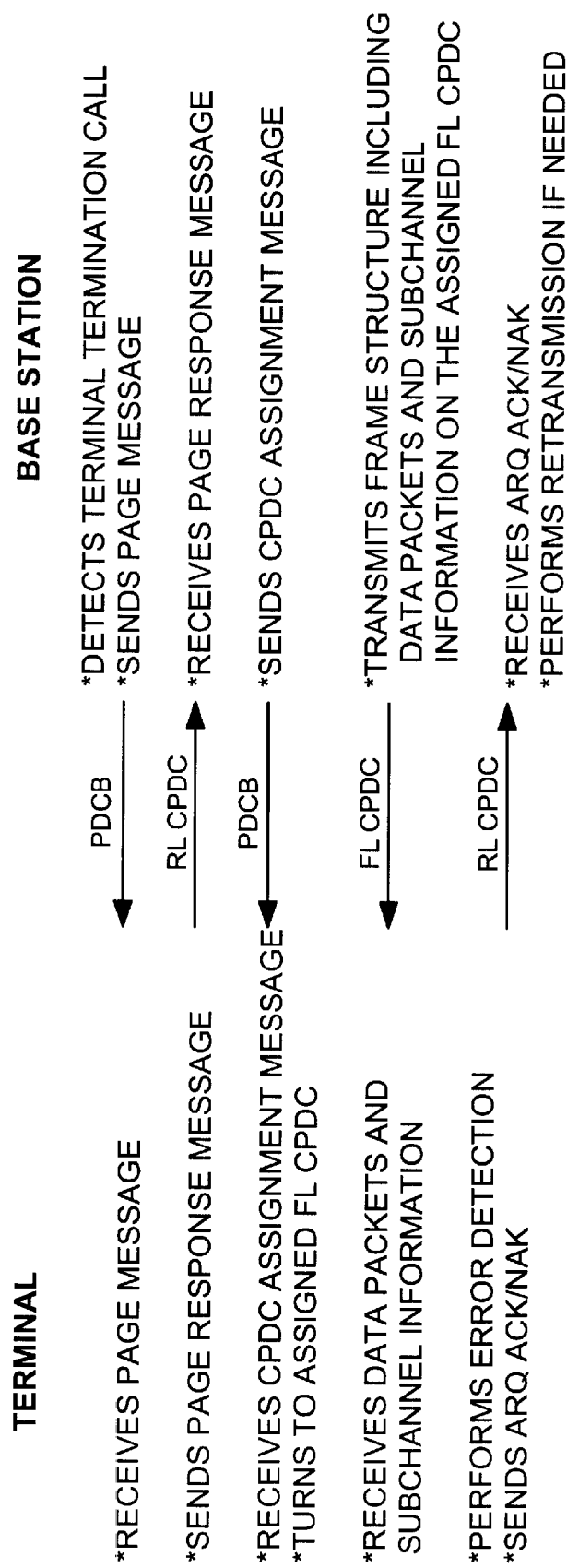
FIG. 7 is a state flow diagram illustrating the steps carried out by both the terminal and the base station for an incoming data call according to a preferred embodiment of the present invention.

FIG. 7 illustrates the steps taken by both a terminal and its serving base station, and the messages sent between them when a packet "call" terminates with the terminal. In such a situation, the base station will receive a terminal termination request from a network switching element, for example, a mobile switching centre. The base station detects a terminal termination call request and sends a packet page message directed to the terminal via the PDCB channel. This page message will typically include information which specifies which spreading code sequence (i.e., which reverse link CPDC channel) the terminal is to use to send acknowledgement messages (unless a previously arranged default channel is used). The terminal will then send a page response message on the reverse link CPDC, acknowledging the packet page message, according to the radio link protocol used. Once the base station receives the page response message from the terminal, a virtual circuit will be assigned between the terminal and the base station, if one has not already been assigned for a particular application. A virtual circuit is assigned by sending a CPDC assignment message to the terminal which assigns a forward link CPDC to be used for this virtual circuit. The terminal will receive the assignment message and "tune" to the assigned forward link CPDC in order to monitor for incoming messages. The base station then transmits messages according to the frame structure of FIG. 3b which includes data packets and subchannel information directed to the terminal on the assigned forward link CPDC. The terminal receives the transmitted frame structure on the forward link CPDC and receives the data packets and subchannel information directed to it. At this point, it should be noted that the terminal receives, despreads and demodulates the entire frame structure in order to process the data packets and subchannel information directed to it. Data packets and subchannel information directed to other terminals on the FL CPDC are discarded. In so doing, the terminal performs block deinterleaving and error control decoding. Error detection is performed in the terminal which sends acknowledgement messages according to the ARQ protocol on the designated reverse link channel. As stated, these acknowledgement messages can be in the form of packets transmitted on the reverse link CPDC channel as described herein or preferably the preamble can contain the acknowledgement message. In any event, the base station receives the appropriate acknowledgement messages and acts accordingly, for example retransmitting packets if needed.

Figure 8:
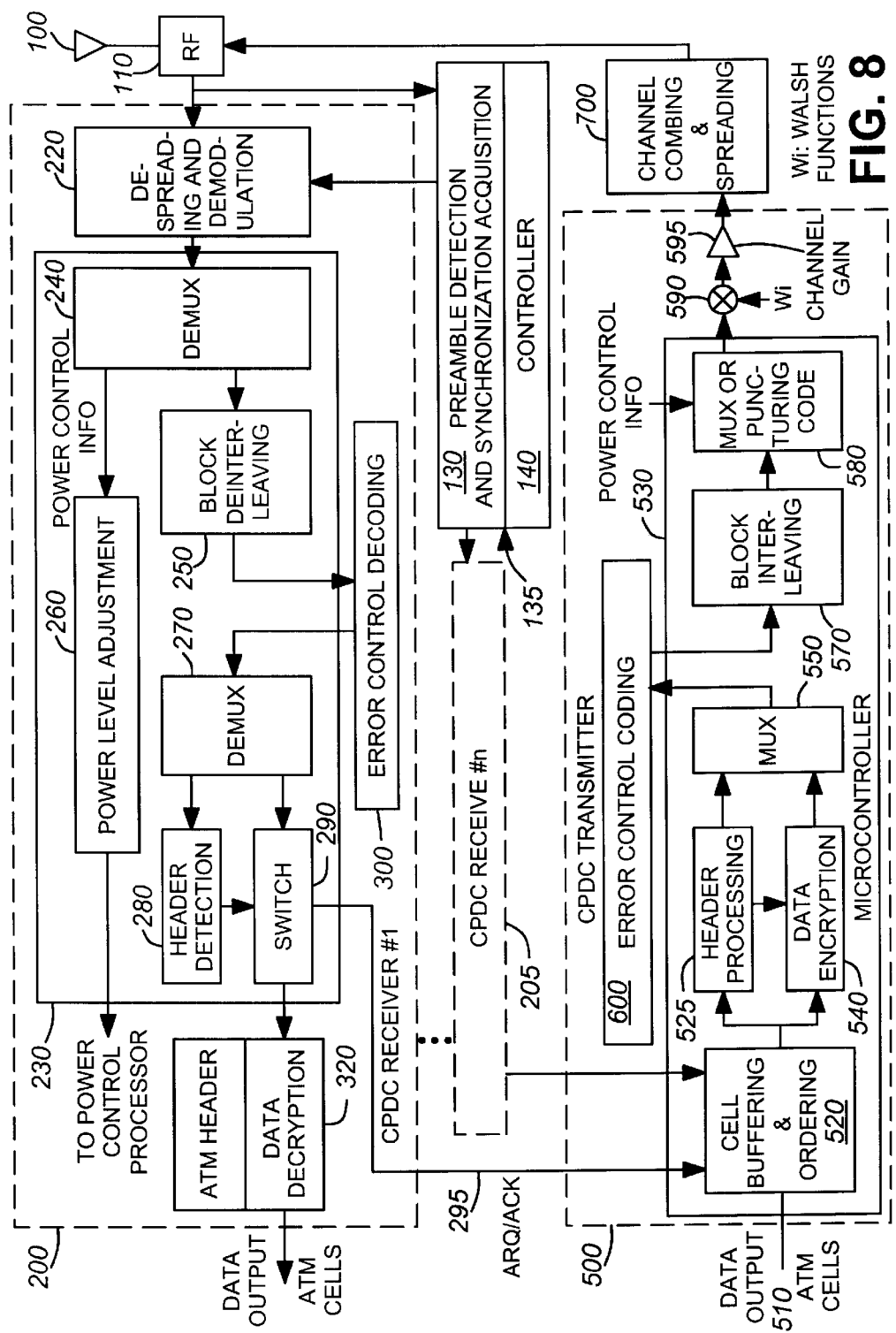
FIG. 8 is a block diagram of a base station CPDC transceiver architecture according to a preferred embodiment of the present invention.

FIG. 8 is a block diagram showing the base station transceiver architecture for handling CPDC traffic. It should be recognized that many other components for handling the full functionality of the base station transceiver are not shown. Communications between terminals and the base stations occur via the antenna 100 and radio unit 110. Note that a plurality of radio units may be utilized. The RF unit 10 handles conventional radio functions for both receiving and transmitting, for example, antenna duplexing, power amplifying, down and up converting, etc. For CPDC purposes, the base station also comprises a control unit 135, and a plurality of CPDC receivers (preferably there will be one CPDC receiver for each terminal allowed to transmit on the CPDC channel for a desired or expected capacity). Two such CPDC receivers 200 and 205 are shown. The base station also includes a CPDC transmitter 500 and a channel combining and spreading unit 700.

When a packet burst from a reverse link CPDC channel is received by the base station, it is down converted by the RF unit 10 wherein the down converted signal is sent to each of the CPDC receivers and the control 135. The control unit 135 comprises a preamble detection and synchronization acquisition block (for example a DSP) 130 as well as a controller 140 which includes, for example, a processor and associated memory for controllig the base station. The controller memory includes software instructions for controlling the base station according to the methods described herein. In particular, the preamble detection and synchronization acquisition unit 130 continuously searches reverse link CPDCs for preambles sent from the terminals. It should be noted that the preambles will all follow a common format and hence can each be detected by the single unit 130 using conventional methods used for detecting preambles in reverse link access channel messages. As stated earlier with reference to FIG. 4, the preamble can act as a request by a terminal which has data packets to transmit, or it can include an acknowledgement message from the terminal (or it can do both). If the preamble only includes acknowledgement information, the controller 140 can process the acknowledgement directly without processing via a CPDC receiver.

The unit 130 captures the preamble and performs synchronization acquisition and then sends the timing information and control information to an available CPDC receiver, for example, receiver 200. The controller 140 allocates each separate incoming packet burst from a particular terminal to an available CPDC receiver. To do this it maintains records of which CPDC receivers are available at any instant in time. If all CPDC receivers are busy, the controller 140 sends a message to the PDCB unit (not shown) to transmit a congestion message on the packet data control broadcast channel. Assuming CPDC receiver 200 is available, the control unit 135 sends the timing information to the despreading and demodulation unit 220 of the allocated CPDC receiver. Note, as described no physical switching is necessary. Each CPDC receiver is connected to the RF unit and is capable of despreading the packets. The unit 135 allocates a receiver by sending the timing information necessary to decode the particular packet burst to the allocated CPDC receiver. Once allocated, the CPDC receiver continues to process frames received from the transmitting terminal until the burst is completed. Note that although not necessary, as described some switching of the CPDC receivers may be desired for other purposes, for example concentration of CPDC receivers.

Thus, this particular base station architecture takes advantage of the fact that as long as there is some time offset between packet bursts on the RL CPDC, each CPDC receiver can decode a particular terminal's packet burst. In the despreading and demodulation block 220, the received signal is despread using the reverse link CPDC spreading code sequence and, then, the despread signal is demodulated in a conventional manner. The output signal, a digital bit stream in the frame structure as shown in FIG. 4b, is fed to the demux block 240 of CPDC receive frame/packet processor 230. At this point, the reader should note that each receive frame/packet processor 230 is shown to carry out several block functions. The reader should note that although several block functions are shown, these can be grouped or performed in different ways either by discrete circuits, a microprocessor with associated software and memory, or other integrated circuits, for example DSPs. In any event, the blocks can be considered to include instructions to a controller for carrying out the blocked function.

In the demux block 240, the multiplexed subchannel information; for example, power control information (power control flag and power control bits) is extracted from the frame and processed. If power control information is present (eg. the PC flag is on), the PC information is fed to the power level adjustment block 260. The power level adjustment is then sent to the base station power control processor which determines the forward link transmit power based on a variety of inputs, including the inputs from the terminals on the shared CPDC channel and based on the total power requirements of the cell/section.

Block interleaving and deinterleaving is performed in order to reduce the impact of fading on the channel. Thus, the demultiplexed signal is sent to block deinterleaving 250. The deinterleaved signal is input to the error control decoding block 300 where certain transmission errors are corrected. In order to provide an adequate quality of service, error detection may be employed to detect non-corrected errors.

Then, the header is abstracted from the decoded signal in demux block 270 and sent to the header detection block 280 for processing. If the packet is for control use (for example, a NAK message requiring retransmission, or a disconnect message), the base station will start the appropriate processes. If it is a data packet without error, the data is sent to the data decryption block 320. The data decryption block 320 decrypts the packet and then the data is sent towards its destination, for example by means of an ATM back haul network from the BTS (or BSC/JMSC or other network node coupled to the BTS).

Note that an ARQ protocol is used to improve the integrity of the data. Various types of acknowledgement messages for example, positive acknowledgements, or negative acknowledgements (plus some control signals to indicate end of burst) etc. can be utilized. For example, if the packet is corrupted, a negative acknowledgement will be put into the data buffer of the transmitter by means of the ARQ/ACK link 295. Alternatively, such a negative acknowledgement (i.e., a retransmission request) can be sent to the terminal via the PDCB, as stated above. Preferably, a positive acknowledgement of the preamble is sent to the transmitting terminal, either via the PDCB or a FL CPDC.

The base station CPDC transceiver architecture also includes CPDC transmit frame/packet processor 530. Once again, certain block functions are illustrated which can be executed by discrete circuits or integrated circuits, for example, DSPs or, as shown, a microprocessor with software stored in an associated memory (not shown). In operation, data input, for example, ATM cells from an ATM backhaul network, is entered into the cell buffering and ordering block 520. The payload for each packet is then encrypted using a suitable data encryption routine via data encryption block 540 which also appends a CRC code calculated over the encrypted data, and then is assembled into packets with an appropriate header by mux 550. Meanwhile, the header is generated by the header processing unit 525 which carries out the following tasks:

1. The address/terminal ID field is entered with a virtual circuit identifier allocated to the destination terminal;
2. The control field flag is specified to indicate whether the payload is for control use (and if so, can specify the type of control information) or contains data (or possibly is a null packet);
3. Writes the packet sequence number into the packet number field; and
4. Computes the CRC check over the header.

The packet is then error control coded by error control coding block 600 and is then fed to the block interleaving unit 570 and interleaved over one or more frames. Power control or other subchannel information (labelled as PC flag and PC bits in FIG. 3b) are then multiplexed within the frame by means of mux 580. The frame structure for the FL CPDC is illustrated in FIG. 3bThe duration of a frame is typically 10 or 20 ms. Each PC flag indicates whether power control is on for an associated terminal over this frame. If PC is on, then the PC bits associated with the PC flag indicate whether the terminal transmit power is to be increased or decreased. Typically, also, the PC is updated at intervals of 1.25 ms. As shown in FIG. 3b, the FL may support a number of logical PC channels (n in the figure). Preferably, there is one PC channel per terminal active on the RL. A specific PC channel is assigned to a specific terminal by a message over the PDCB channel on the FL and an acknowledgement on the CPDC on the reverse link. If PC is not on, the PC bits, in conjunction with the PC flag, can be used for other purposes, for example, providing signalling information. Thus, the frame structure of FIG. 3b more generally illustrates a frame structure wherein the frame includes subchannel information. In this figure, there are n subchannels, wherein each subchannel comprises a flag and associated bits of subchannel information associated with each flag, located at regular intervals within the frame structure. The flag determines the nature of the associated bits. Thus, for example, referring to FIG. 3b, PC flag 1 could indicate to terminal 1 that its associated subchannel bits (i.e., the bits labelled as PC 1 which are associated with PC flag 1) represent power control bits whereas PC flag 2 could indicate that the subchannel information in associated subchannel bits (labelled as PC 2) contain other information, for example, flow control information. Thus, the frame processor 530 produces a frame structure which includes subchannel information and individual packets for a plurality of terminals.

Continuing with FIG. 8, the packets are then subject to Walsh spreading in a conventional manner via multiplier 590 and then fed to amplifier 595 the gain of which is controlled by the output from the power control processor (not shown). The signal is then sent to the channel combining and spreading unit 700 where it is spread according to the forward link CPDC spreading code and then sent to the radio block 110 for transmission via antenna 100.

It should be noted that although specific blocks are shown for both the receiver and transmitter, certain blocks can be combined and shared by both. For example, each receiver and transmitter are shown to include a separate header processing or header detection block, whereas they could share a common header processor which produces the headers for outgoing packets and decodes the headers for incoming packets. More generally, although receive frame processor 230 and transmit frame processor 530 are shown as separate blocks, a single frame processor which is used to perform both functions can be used.

Figure 9:
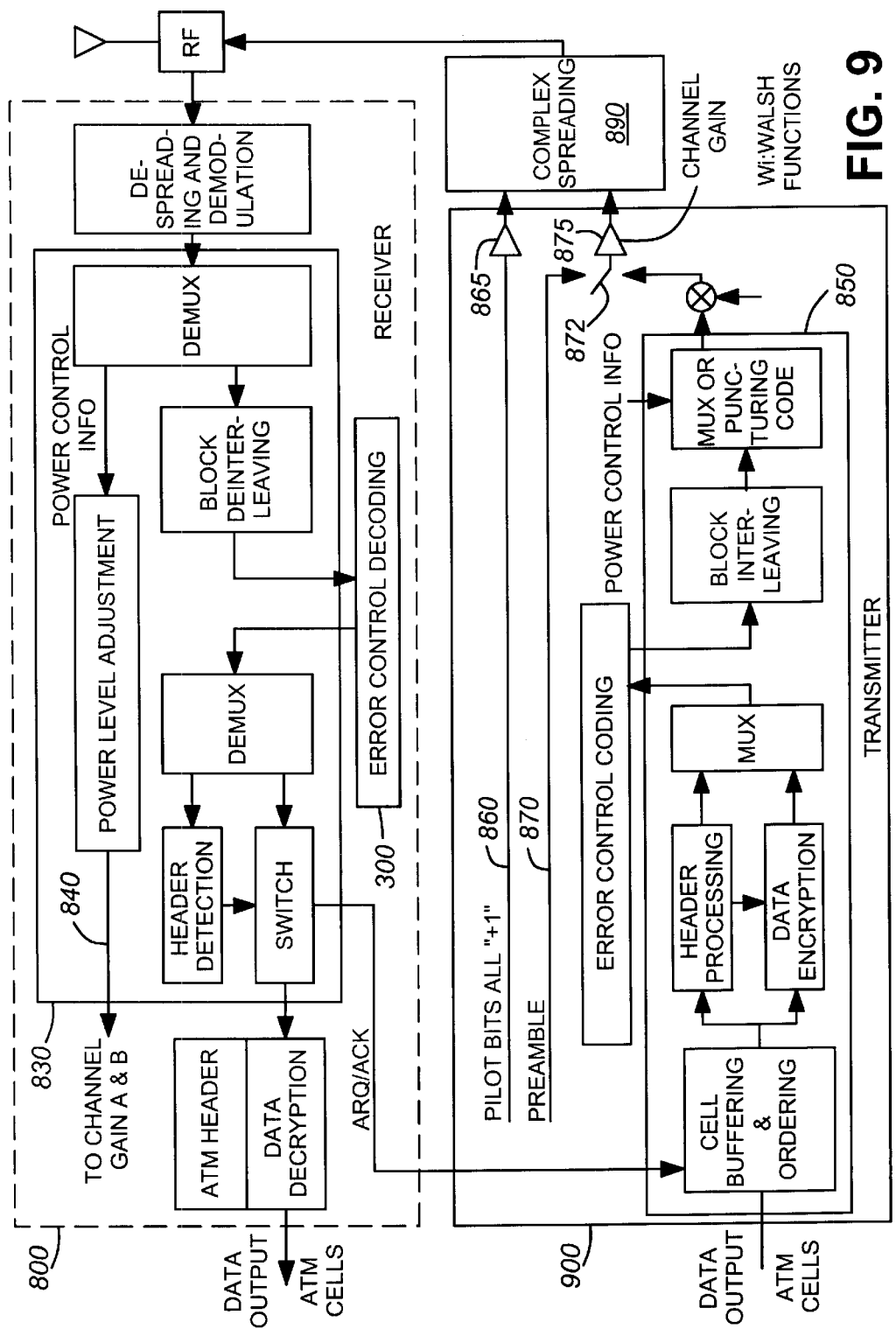
FIG. 9 is a block diagram illustrating the transceiver architecture of a terminal according to a preferred embodiment of the present invention.

FIG. 9 is a block diagram showing the terminal transceiver architecture for handling CPDC traffic. It should be recognized that many other components for handling full functionality of the terminal are not shown. Furthermore, as with the base station, although several block functions are shown to be grouped in a specific way, these can be grouped or performed in different ways, either by discrete circuits, microprocessors with associated software and memory or other integrated circuits, for example DSP. Furthermore, the blocks can be considered to include instructions to a controller for carrying out the block function.

Many of the blocks and their arrangement in the terminal transceiver architecture follow a similar form as that in the base station architecture. Therefore we will only describe the significant differences. It can be seen that in a terminal there will typically be only one CPDC receive frame processor 830 and one transmit frame processor 850 as one CPDC transceiver can typically multiplex several data applications at once, by maintaining multiple logical links. Furthermore the control unit for the terminal (not shown) does not need to perform the preamble detection and synchronization for a series of incoming packets. The terminal transceiver will still have a central controller and associated memory (not shown). Of course depending on the nature of the terminal, more than one CPDC receive and transmit frame processor can be included to increase capacity, for example, if the transceiver forms part of a wireless interface unit, for example a fixed wireless access subscriber unit, capable of providing telecommunications services to more than one terminal unit.

In the preferred embodiment shown, differences between the terminal transceiver architecture and the base station transceiver architecture are as follows, bearing in mind the general differences between base and terminal.

First, the power level adjustment signal 840 produced by the power level adjustment block is supplied directly to both channel gain amplifier A 865 and channel gain amplifier B 875 for controlling the power of both the main signal to be transmitted and the pilot signal described below. Power control information directed to a particular terminal can be directly used by the terminal to adjust its transmit power based on instructions to it from the base station. This differs from power control information sent by the terminal and received by the base station, as the base station must consider the PC adjustment requests of all terminals as it regulates the power control of the entire cell.

Each terminal is shown to include a header detection and processing block. As noted with reference to the base station architecture, these can be grouped in a common header processor shared by both the receive processor and the transmit processor, which performs header detection and decoding during the receive stage, and header production during the transmit stage. These blocks perform essentially the same function as described above with respect to the base station, although the reader should note that there may be slight differences in the headers due to the nature of the differences in the data structure between the forward link and reverse link headers.

Furthermore, the control unit (once again not shown) includes a memory for storing the spreading code sequences received by the base station upon registration, which are utilized by the despreading or spreading blocks to receive and send packets respectively.

Turning now to the transmitter 900 it can be seen that the transmitter includes a pilot channel 860 with its associated channel gain amplifier 865, a second channel gain amplifier 875 whose input is selected by switch 872 to be the output from the transmit frame processor 850 or the preamble 870.

A pilot channel 860 is provided for coherent reverse link reception at the base station. The data of the pilot channel is all "+", represented by a high level signal. The channel gain A is controlled by the signal from the power level adjustment block in order to obtain the desired transmit power level. Then, the power controlled pilot channel signal is sent to the I-channel of the complex spreading block, where the conventional spreading operation is performed.

The preamble data 870 is produced by a preamble generator (not shown). At the beginning of each data burst, the switch 872 is controlled to select the preamble for transmission. The preamble data is power controlled by the channel gain B. The power controlled preamble signal is sent to the Q-channel of the complex spreading block, where the conventional spreading operation is performed. When the receiver receives an acknowledgement from the base station, the switch is reset to select the data transmission branch, wherein transmission of the preamble is stopped, and transmission of the packets begins. The complex spreading block 890 performs channel combining and spreading according to the selected reverse link spreading code sequence. It should be noted that different complex spreading arrangements are possible for the pilot channel, the preamble and the packet data.

Note that the data input to the transmit frame processor 850 and the data output from the receive processor is shown to consist of ATM cells, but other formats for the data can be used.

Figure 10:
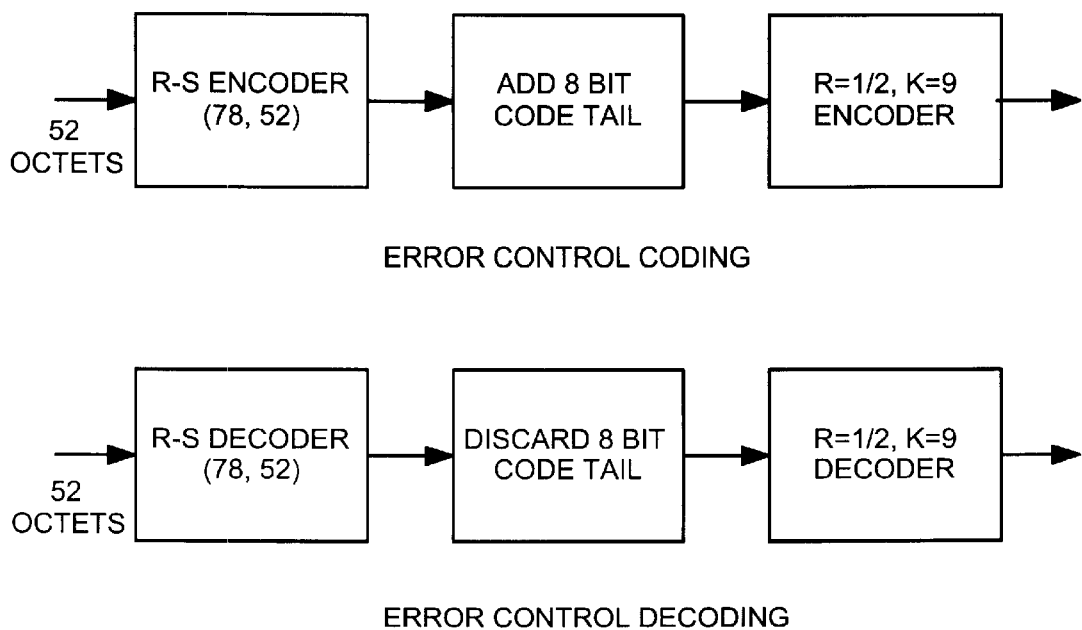
FIG. 10 is a block diagram illustrating the preferred error correction coding and decoding procedures.

Both the base station and the terminal have shown an error control decoding and error control coding block. Conventional error control coding and decoding can be used, however the preferred embodiment of the invention utilizes a specific type of error control coding and decoding as shown in FIG. 10. Note that as an alternative to multiplexing each frame with subchannel information, subchannel information can be punctured. In this case, the error control decoding block of the base station or terminal will need to know the status of the PC flag, for example by a signal (not shown) from the demux block 240. Similarly, on the transmit side, the frame will be punctured with subchannel information by mux 580 of the base station or terminal.

For the error control coding, serially concatenated codes with Reed-Solomon (R-S) code as outer code and conventional code as inner code can be used. The R-S code can be used for both error correction and error detection for ARQ, as necessary. The R-S code is chosen for the following reasons. First, the R-S code has strong capability to correct burst errors, which is desired for an outer code. Second, it is easy to find a R-S code with a code symbol of 8 bits, or octet, which an ATM cell consists of, so that an ATM cell can be directly coded with the R-S code. FIG. 10 shows a possible numerology for the concatenated codes. At the input of the Error Control Coding block, 52 octets of data, including the header, are fed into the (78,52) R-S encoder. Code tail bits, for example 8 bits, can be added to the R-S coded data packet in order to be able to decode an inner convolutional code using only data from this block. Then, the data packet undergoes a convolutional coding by using a convolutional code of, for example, rate 1/2 with the constraint length of K=9. The convolutional encoded data packet is then sent to the Block Interleaving block. As can be seen in FIG. 10, the reverse steps are carried out during the decoding operation.

For example, we have shown RL and FL CPDC structures wherein the Power Control (PC) flag is multiplexed within the frame structure. This is particularly desirable in situations where very quick power control adjustments are needed, as the power control information can be quickly extracted and used without waiting for error control processing and header detection. This is assumed in the embodiments shown in FIGS. 9 and 10, wherein, for example, the Demux unit 240 extracts the power control flag in order to determine whether power control bits are included (either multiplexed or punctured) and sent for power level adjustment 260, without having to wait for completion of the header detection block 280. Similarly, on the transmit side, Mux unit 580 multiplexes power control information (which includes the PC flag and PC bits) into the data as appropriate. However, as an alternative for appropriate applications, subchannel information, for example, the PC flag and PC (or other) bits can be included as part of the packet structure.

Figure 11:
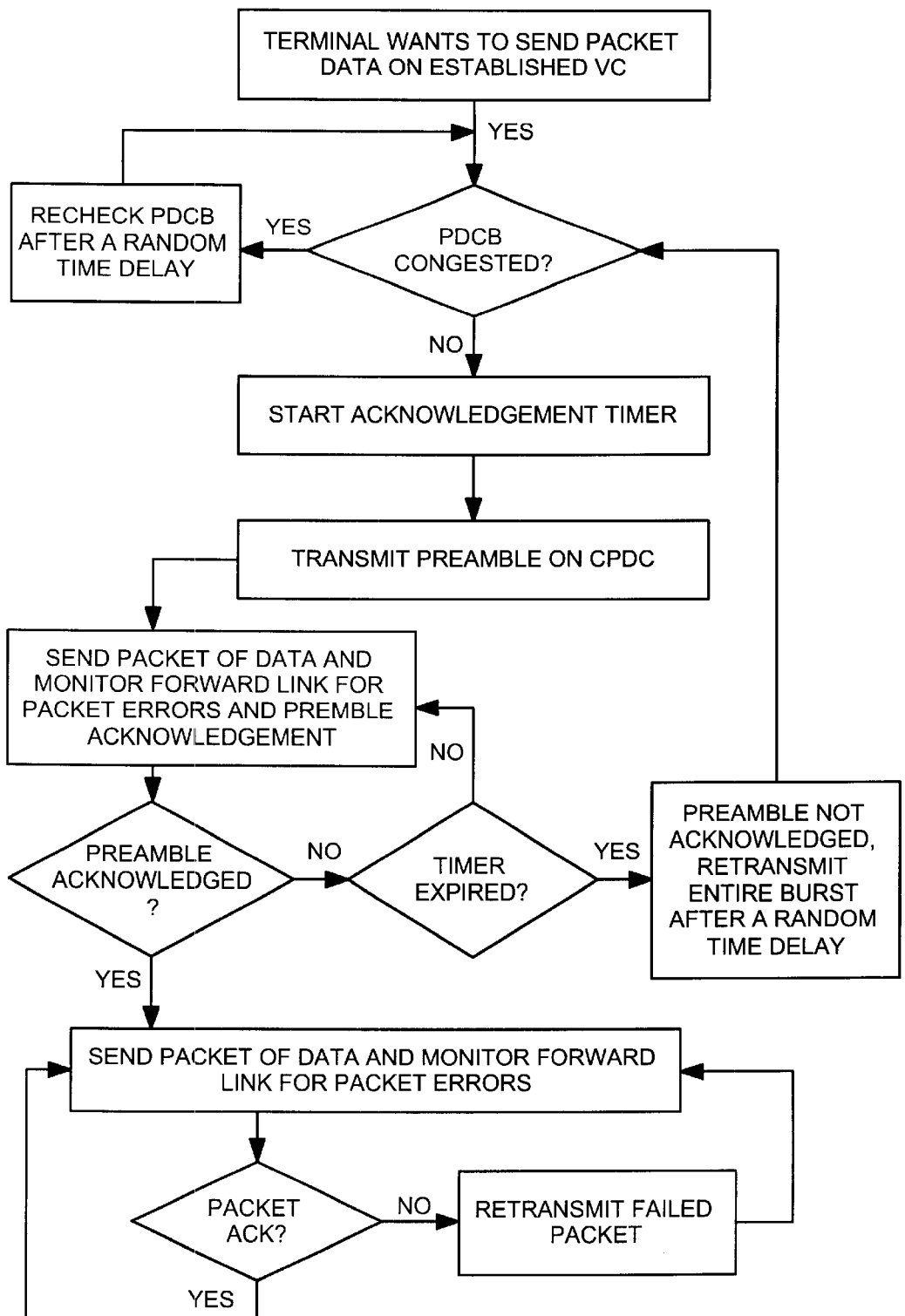
FIG. 11 is an alternative embodiment of FIG. 6.

FIG. 11 illustrates an alternative method of transmission of a packet burst by a terminal. FIG. 11 is similar to FIG. 6, except that in FIG. 11 a terminal does not wait for an acknowledgement from the base station of its preamble before sending packets of data. Rather, as shown in FIG. 11, the terminal transmits the preamble on the reverse link CPDC and then immediately starts sending packets of data. These packets of data are organized into frames, which preferably include subchannel information as described above. While sending the packets of data, the terminal monitors the forward link for both packet errors and a message acknowledging the preamble. Note that the terminal may be monitoring both a forward link CPDC and the PDCB at this step. Once the preamble is acknowledged, the terminal continues to send packets of data and monitors the forward link for packet errors. The terminal retransmits any failed packet. If the preamble was not acknowledged within the specified period of time, the terminal assumes that all of the packets of data which it had transmitted were not received, waits a random period of time and then retransmits the entire burst.

The preferred embodiments as described above involved the transmission of frame structures which include subchannel information. This subchannel information can be used as power control adjustment information to be used in controlling the transmit power of the receiving unit (basestation or terminal). Controlling the transmit power of the individual terminals is relatively straight forward. However for clarity, we will now elaborate some general principles of basestation power control. There are two general ways of designing a system as discussed.

One way is to simply not use dynamic power control at all. The base station will transmit at a fixed power level which is preset so that every terminal in the cell will receive the transmissions, regardless of where they may be located or what local conditions will occur ( within some limits). In this case, the subchannel information will always be used for some other purpose, or can be eliminated altogether.

The second way is to dynamically control the power level so as to minimize the output power while providing sufficient power as needed to all users. This can be done in several ways. For example, the power control information can be used to provide sufficient power to be received by all terminals currently using the data channels. Preferably power control is used on a frame-by-frame basis, wherein each frame is transmitted with sufficient power to reach every terminal for which the frame contains data. As a consequence of this option, some terminals served by a basestation may not receive a frame for which there is no data directed to them ( with sufficient power to properly decode the frame). The basestation should therefore ensure sufficient frames are received by all terminals using the data channels so as to maintain the communication links.

Numerous other modifications, variations and adaptations may be made to the particular embodiments of the invention described above without departing from the scope of the invention, which is defined in the claims.

What is claimed is:

1. A method of providing both packet-based services and stream-based services in a CDMA network having at least one base station and a plurality of terminals, said method comprising:
    a) allocating distinct spreading code sequences for each stream-based service;
    b) allocating shared spreading code sequences for a plurality of packet-based services such that more than one terminal can use the shared spreading sequences;
    c) allocating a packet data control broadcast sequence for forward link control communications between said base station and said plurality of terminals;
    d) for packets to be transmitted on the forward link, transmitting packets using a shared spreading sequence on a sequential basis; and
    e) for packets to be transmitted on the reverse link, each terminal transmits packets using a shared spreading sequence whenever said terminal has packets ready for transmission, provided said network is not congested.

2. A method of providing both packet-based services and stream-based services in a CDMA network having at least one base station and a plurality of terminals, said method comprising:
    a) allocating a distinct channel for each stream-based service;
    b) allocating at least one shared forward link channel and at least one shared reverse link channel for a plurality of packet-based services such that more than one terminal can use the shared channels;
    c) allocating a packet data control broadcast channel for forward link control communications between said base station and said plurality of terminals;
    d) on the reverse link, whenever a terminal has packets ready for transmission, before transmitting said packets said terminal:
        I) determines whether the system is congested; and
        II) if not congested, transmitting a request to said base station.

3. The method as claimed in claim 2 wherein step (d) further comprises:
    III) responsive to a determination the network is congested, waiting a random time and then proceeding with step I) again.

4. The method as claimed in claim 3 wherein step (d) further comprises:
    IV) monitoring communications from said base station for an acknowledgement of said request; and
    V) upon receiving acknowledgement of said request, transmitting said packets.

5. The method as claimed in claim 4 wherein step (d) further comprises:
    VI) while no acknowledgement of said request has been received, continuing to transmit said request until a specified period of time expires.

6. The method as claimed in claim 3 wherein step (d) further comprises:
    IV) after transmitting said request, transmitting packets;
    V) monitoring communications from said base station for an acknowledgement of said request while transmitting said packets; and
    VI) if no acknowledgement of said request is received within a specified time, waiting a random time and then commencing with step I again.

7. The method as claimed in claim 4 wherein packets transmitted on said at least one shared channels comprise header, payload and error detection parts, wherein said header and payload cooperate to include power control information.

8. The method as claimed in claim 4 wherein packets transmitted on said at least one shared channels comprise header, payload and error detection parts, wherein said payload includes power control information.

9. The method as claimed in claim 2 wherein packets transmitted on said at least one shared channels comprise header, payload and error detection parts, said method further comprising the steps of:
    producing frame structure to be transmitted, said frame structure including packets to be transmitted and subchannel information; and
    transmitting said frame structure.

10. The method as claimed in claim 4 wherein packets transmitted on said at least one shared channels comprise header, payload and error detection parts, said method further comprising the steps of:
    producing frame structure to be transmitted, said frame structure including packets to be transmitted and subchannel information; and
    transmitting said frame structure.

11. The method as claimed in claim 6 wherein packets transmitted on said at least one shared channels comprise header, payload and error detection parts, said method further comprising the steps of:
    producing frame structure to be transmitted, said frame structure including packets to be transmitted and subchannel information; and
    transmitting said frame structure.

12. The method as claimed in claim 9 wherein said subchannel information includes at least one flag and associated bits of subchannel information associated with said at least one flag, wherein the nature of said associated bits is determined by said at least one flag.

13. The method as claimed in claim 10 wherein said subchannel information includes at least one flag and associated bits of subchannel information associated with said at least one flag, wherein the nature of said associated bits is determined by said at least one flag.

14. The method as claimed in claim 11 wherein said subchannel information includes at least one flag and associated bits of subchannel information associated with said at least one flag, wherein the nature of said associated bits is determined by said at least one flag.

15. The method as claimed in claim 12 wherein said producing frame structure step comprises the step of puncturing said subchannel information into said frame structure.

16. The method as claimed in claim 12 wherein said producing frame structure step comprises the step of multiplexing said subchannel information into said frame structure.

17. The method as claimed in claim 12 wherein said at least one flag indicates whether said bits of subchannel information includes power control bits.

18. The method as claimed in claim 12 wherein said at least one flag comprises one flag per frame to each terminal using said shared channel pair and wherein each flag has an associated series of subchannel information bits located at regular intervals within said frame structure.

19. The method as claimed in claim 18 wherein said subchannel information comprises power control information and said one flag per frame per terminal indicates each associated series of subchannel bits directed to a terminal which is to receive power control information represents power control bits for adjusting the transmit power of said terminal.

20. The method as claimed in claim 2 wherein said request comprises a preamble which provides synchronization information to said base station.

21. The method as claimed in claim 18 wherein said request comprises a preamble which provides synchronization information to said base station.

22. The method as claimed in claim 20 wherein said preamble further comprises control information which identifies the requesting terminal to said base station.

23. A terminal for communicating with a telecommunications network using stream-based and packet based services comprising:
    a transceiver;
    a controller;
    memory for storing data and instructions for said controller;
    said controller adapted to store one set of spreading code sequences for accessing stream-based service channels and another set of spreading code sequences for accessing packet-based service channels.

24. A terminal as claimed in claim 23 wherein said instructions for said controller comprises:
    instructions for said controller to utilize spreading code sequences designated by a serving base station for packet communication with said base station;
    instructions for sending a preamble when the terminal desires to transmit packets for said packet based services;
    instructions to monitor communications from said base station using said spreading code sequences for an acknowledgement of said preamble from said base station;
    instructions for deciphering said acknowledgement; and
    instructions to said controller for transmitting packets once said acknowledgement is received.

25. A terminal as claimed in claim 23 further comprising:
    means for transmitting a preamble prior to transmitting packets when packets are to be transmitted using said packet-based service; and
    means for monitoring communications from a serving base station for a message acknowledging receipt of said preamble.

26. A terminal as claimed in claim 25 further comprising means for monitoring a channel for a congestion message from said base station, wherein said terminal only transmits said preamble if no congestion message has been received.

27. A terminal as claimed in claim 26 further comprising means for registration with said base station; and means for storing spreading code sequences received by said base station for packet bases services upon registration.

28. A terminal as claimed in claim 24 further comprising:
    a header processor for producing a header for outgoing packets and for setting a power control flag in said header to indicate said payload contains multiplexed power control bits; and
    means for multiplexing power control bits within said payload.

29. A terminal as claimed in claim 27 further comprising:
    a header processor for producing a header for outgoing packets and for setting a power control flag in said header to indicate said payload contains multiplexed power control bits; and
    means for multiplexing power control bits within said payload.

30. A terminal as claimed in claim 29 further comprising:
    a header detector for detecting a header in an incoming packet and determining whether a power control flag in said header indicates said payload contains multiplexed power control bits; and
    means for demultiplexing power control bits within said payload for use in adjusting the transmit power of said terminal.

31. A terminal as claimed in claim 24 further comprising:
    means for receiving a frame structure from a serving base station, wherein said frame structure includes information directed to a plurality of terminals; and
    means for extracting and processing information directed to said terminal.

32. A terminal as claimed in claim 27 further comprising:
    means for receiving a frame structure from a serving base station, wherein said frame structure includes information directed to a plurality of terminals; and
    means for extracting and processing information directed to said terminal.

33. A terminal as claimed in claim 31 wherein said frame structure includes packets and subchannel information directed to a plurality of terminals and wherein said means for extracting comprises:
    means for despreading and demodulating the frame structure;
    means for processing subchannel information directed to said terminal from said frame structure; and
    means for processing packets directed to said terminal from said frame structure.

34. A terminal as claimed in claim 33 wherein said means for processing subchannel information and said means for processing packets each receive at least a portion of said frame in parallel, such that said means for processing subchannel information can process said subchannel information without requiring said packets to be processed.

35. A terminal as claimed in claim 32 wherein said frame structure includes packets and subchannel information directed to a plurality of terminals and wherein said means for extracting comprises:
   means for despreading and demodulating the frame structure;
   means for processing subchannel information directed to said terminal from said frame structure; and
   means for processing packets directed to said terminal from said frame structure;
   wherein said means for processing subchannel information and said means for processing packets each receive at least a portion of said frame in parallel, such that said means for processing subchannel information can process said subchannel information without requiring said packets to be processed.

36. A terminal as claimed in claim 33 further comprising means for adjusting the transmission characteristics of said terminal responsive to said means for processing subchannel information.

37. A terminal as claimed in claim 36 wherein said subchannel information comprises power control information directed to said terminal and wherein said means for adjusting comprises means for adjusting the transmit power of said transceiver.

38. A terminal as claimed in claim 31 further comprising means for combining packets to be transmitted and subchannel information to be transmitted into a frame structure to be transmitted by said transceiver.

39. A terminal as claimed in claim 32 further comprising means for combining packets to be transmitted and subchannel information to be transmitted into a frame structure to be transmitted by said transceiver.

40. A terminal as claimed in claim 38 further comprising means for combining a pilot channel structure with said frame structure.

41. A terminal as claimed in claim 25 comprising:
   means for transmitting said preamble until a timer expires or said acknowledgement message is received; and
   means for transmitting said packets when said acknowledgement message is received.

42. A base station for providing stream based services and packet based services to terminals comprising:
   transmit means for transmitting forward link frame structures containing packet data to a plurality of terminals using a shared spreading code sequence; and
   receive means for receiving reverse link frame structures containing packet data from a plurality of terminals using a shared spreading code sequence.

43. A base station as claimed in claim 42 wherein said receive means comprises a plurality of receivers for processing a received frame structure; and further comprising means for allocating a received frame structure to an idle receiver.

44. A base station as claimed in claim 43 wherein said transmit means comprises means for producing a forward link frame structure to be transmitted comprises:
   means for combining packets and subchannel information directed to a plurality of terminals into a single frame structure.

45. A base station as claimed in claim 44 wherein each received frame structure comprises packets and subchannel information and wherein each receiver comprises means for processing subchannel information and means for processing packets.

46. A base station as claimed in claim 45 wherein said means for processing subchannel information and said means for processing packets each receive at least a portion of said received frame structure in parallel, such that said means for processing subchannel information can process said subchannel information without requiring said packets to be processed.

47. A base station as claimed in claim 46 further comprising a power control processor which determines the transmission characteristics of said forward link responsive to the means for processing subchannel information of the plurality of receivers; and
   means for adjusting the transmission characteristics of said forward link responsive to said power control processor.

48. A base station as claimed in claim 47 further comprising:
   means for monitoring communications from terminals registered to the base station for a preamble; and means for transmitting a message acknowledging receipt of said preamble.

49. A base station as claimed in claim 48 further comprising:
   means for transmitting a congestion message to terminals when there is congestion.

50. A base station as claimed in claim 49 further comprising:
   a header processor for producing a header for outgoing packets and for setting a power control flag in said header to indicate said payload contains multiplexed power control bits; and
   means for multiplexing power control bits within said payload.

51. A base station as claimed in claim 50 further comprising:
   a header detector for detecting a header in an incoming packet and determining whether a power control flag in said header indicates said payload contains multiplexed power control bits; and
   means for demultiplexing power control bits within said payload for use in adjusting the transmit power of said forward link.

52. A base station for providing stream based services and packet based services to terminals comprising:
   transmit means for transmitting forward link frame structures containing packet data to a plurality of terminals using a shared spreading code sequence;
   receive means for receiving reverse link frame structures containing packet data from a plurality of terminals using a shared spreading code sequence; and
   a controller for carrying out the method of claim 1.

53. A base station for providing stream based services and packet based services to terminals comprising:
   transmit means for transmitting forward link frame structures containing packet data to a plurality of terminals using a shared spreading code sequence;
   receive means for receiving reverse link frame structures containing packet data from a plurality of terminals using a shared spreading code sequence; and
   a controller for carrying out the method of claim 2.

* * * * *